United States Patent [19]
Chiba et al.

[11] Patent Number: 5,368,097
[45] Date of Patent: Nov. 29, 1994

[54] HEAT EXCHANGER

[75] Inventors: Tomohiro Chiba; Kenichi Sasaki, both of Isesaki, Japan

[73] Assignee: Sanden Corporation, Isesaki, Japan

[21] Appl. No.: 141,564

[22] Filed: Oct. 27, 1993

[30] Foreign Application Priority Data

| Oct. 27, 1992 | [JP] | Japan | 4-74715[U] |
| Oct. 29, 1992 | [JP] | Japan | 4-75240[U] |
| Apr. 21, 1993 | [JP] | Japan | 4-20655[U] |

[51] Int. Cl.$^5$ .............................. F28D 1/047
[52] U.S. Cl. .................. 165/150; 165/178; 165/173
[58] Field of Search ............... 165/150, 153, 176, 178, 165/173

[56] References Cited

U.S. PATENT DOCUMENTS

| 2,707,868 | 5/1955 | Goodman | 62/4 |
| 2,816,738 | 12/1957 | McElgin | 165/151 |
| 2,991,978 | 7/1961 | Jones | 165/111 |
| 3,746,525 | 7/1973 | Kasuga et al. | 65/12 |
| 4,244,194 | 1/1981 | Haesters et al. | 62/515 |
| 4,549,605 | 10/1985 | Sacca et al. | 165/150 |
| 4,589,265 | 5/1986 | Nozawa | 62/526 |
| 4,919,929 | 4/1990 | Shimazaki | 62/515 |
| 4,962,811 | 10/1990 | Yamamoto | 165/173 |
| 5,094,293 | 3/1992 | Shinmura | 165/178 |
| 5,179,845 | 1/1993 | Sasaki et al. | 62/515 |
| 5,211,222 | 5/1993 | Shinmura | 165/176 |

FOREIGN PATENT DOCUMENTS

| 2705178 | 9/1977 | Germany | 165/150 |
| 57-73392 | 5/1982 | Japan | 165/150 |
| 61-66092 | 4/1986 | Japan | 165/178 |
| 62-5097 | 1/1987 | Japan . | |
| 1256228 | 3/1969 | United Kingdom . | |

*Primary Examiner*—Allen J. Flanigan
*Attorney, Agent, or Firm*—Baker & Botts

[57] ABSTRACT

The present invention is directed to a heat exchanger, such as an evaporator for an automotive air conditioning refrigeration circuit. The heat exchanger includes a serpentine tube in which the interior space is divided by a plurality of parallel partition wall into a corresponding plurality of essentially parallel passages through which refrigerant fluid flows, and inlet and outlet mechanisms connected to the two opposite terminal ends of the serpentine tube, respectively. The inlet mechanism comprises a cylindrical header pipe portion which is fixedly disposed at one terminal end of the serpentine tube along the depth of the serpentine tube, and a separate cylindrical conducting pipe portion of which one terminal end is connected at a right angle to the inner side section of the air outflow region of the header pipe portion. Preferably, the terminal end of the conducting pipe portion includes a flat tube region at its terminal end, and further includes an axial movement preventing mechanism for preventing axial movement of the conducting pipe portion after insertion of the flat tube region of the conducting pipe portion into the header pipe portion.

12 Claims, 9 Drawing Sheets

HEAT EXCHANGER

BACKGROUND OF THE INVENTION

1. Field of the Invention

This invention relates to heat exchangers, and more particularly, to an evaporator or a condenser for use in an automotive air conditioning refrigeration circuit.

2. Description of the Prior Art

Heat exchangers for use in automotive air conditioning refrigeration circuits, such as evaporators or condensers, are known in the art. Referring to FIG. 1, a heat exchanger for use in an automotive air conditioning refrigeration circuit, such as serpentine-type evaporator 10 is shown. Evaporator 10 includes continuous serpentine flat tube 11 through which refrigerant fluid flows. Serpentine tube 11 includes a plurality of spaced, parallel planar portions 12 and a corresponding plurality of curved connecting portions 121. Air flows through evaporator 10 between planar portions 12 in the direction of arrows "A" as shown in FIG. 1. As shown in FIG. 2, the interior space of serpentine tube 11 is divided by a plurality of parallel partition walls 111 into a corresponding plurality of essentially parallel passages 112, through which refrigerant fluid flows.

Serpentine tube 11 has two terminal ends and is provided with inlet mechanism 15 and outlet mechanism 16 at its first terminal end 11a and second terminal end 11b, respectively. Inlet mechanism 15 is linked to the output of a compressor or other suitable compression means (not shown) of the refrigeration circuit through a connecting pipe member (not shown), and outlet mechanism 16 is linked to an inlet of the compressor through another connecting pipe member (not shown). Refrigerant fluid flows into serpentine tube 11 from the compressor via inlet mechanism 15, flows through each successive planar portion 12 and connecting portion 121 towards outlet mechanism 16, and is then returned to the compressor. The refrigeration circuit may include other elements disposed between the compressor and evaporator 10.

Inlet mechanism 15 includes a cylindrical header pipe portion 151 and a separate cylindrical conducting pipe portion 152. Header pipe portion 151 is designed so that its inner diameter is slightly greater than the outer diameter of conducting pipe portion 152. Header pipe portion 151 is further designed so that its length is slightly greater than the depth of serpentine tube 11, wherein depth is the lateral dimension of tube 11 taken in the direction of airflow "A". Furthermore, header pipe portion 151 has a clad construction in which the inner peripheral surface of header pipe portion 151 is fixedly covered with a brazing metal. Conducting pipe portion 152 is bent to have a generally U-shaped configuration so that conducting pipe portion 152 includes integral first, second and third straight regions 152a, 152b and 152c. Second and third straight regions 152b and 152c of conducting pipe portion 152 are parallel to each other. One end of 152b and one end of 152c are connected at right angles to the opposite ends of first straight region 152a, respectively. The length of second straight region 152b is shorter than third straight region 152c. The end of third straight region 152c, which is disposed opposite from where it is connected to first straight region 152a, is bent downwardly at a right angle. Union joint mechanism 153 is provided at this other end of third straight region 152c of conducting pipe portion 152 allowing it to be connected to one end of a connecting pipe member (not shown).

Cap member 154 also has a clad construction and is provided at the upstream opening end of header pipe portion 151 which is located at the upstream or air inflow side of evaporator 10, and is fixedly and hermetically connected to the upstream opening end of header pipe portion 151 by brazing. The first terminal end 11a of serpentine tube 11 is inserted into the inner hollow space of header pipe portion 151 through a slot (not shown) formed at the lower or bottom region of header pipe portion 151, and is fixedly and hermetically connected thereto by brazing so as to allow fluid communication. The end of second straight region 152b, which is located opposite the end connected to first straight region 152a, is slightly inserted into the inner hollow space of header pipe portion 151 through the other opening end of header pipe portion 151, located at the downstream or air outflow side of evaporator 10, and is fixedly and hermetically connected thereto by brazing so as to allow fluid communication.

Outlet mechanism 16 includes cylindrical header pipe portion 161. Cap member 162 is provided at the downstream opening end of header pipe portion 161 located at the downstream or air outflow side of evaporator 10, and is fixedly and hermetically connected thereto by brazing. At approximately the middle (i.e., lengthwise) of header pipe portion 161, which is located at the upstream or air inflow side of evaporator 10, the header pipe portion 161 is bent downwardly at a right angle, and the region of header pipe portion 161 located at the upstream opening end is bent horizontally inwardly at a right angle, i.e., bent at a right angle such that the main axis of this end portion is perpendicular to the planes of parallel passages 112, with the upstream opening end of header pipe portion 161 oriented facing toward the plane of the parallel passages 112 having the first terminal end 11a. Union joint mechanism 163 is provided at the upstream opening end of header pipe portion 161, allowing it to be connected to one end of another connecting pipe member (not shown). The second terminal end 11b of serpentine tube 11 is inserted into the inner hollow space of header pipe portion 161 through a slot (not shown) formed at the bottom or lower region of header pipe portion 161, and is fixedly and hermetically connected thereto by brazing so as to allow fluid communication.

Evaporator 10 further includes corrugated heat receiving metal sheets or fin units 13 disposed between opposed planar portions 12. Fin units 13 are fixed to planar portions 12 by brazing along the lines of contact. Protective side plates 14 are fixed to the exterior side of each of the outside fin units 13. Fin units 13 enhance the heat exchange between the air flowing through evaporator 10 and the refrigerant fluid flowing through serpentine tube 11.

During operation of the automotive air conditioning refrigeration circuit which includes evaporator 10, refrigerant fluid is provided to serpentine tube 11 from the compressor via a connecting pipe member, conducting pipe portion 152 and header pipe portion 151 of inlet mechanism 15, and then flows through each successive planar portion 12 and connecting portion 121 of serpentine tube 11 towards header pipe portion 161 of outlet mechanism 16, and is then returned to the compressor via the other connecting pipe member. When the refrigerant fluid flows through each successive planar portion 12 and connecting portion 121 of serpentine tube 11, the heat exchange between the air flowing through evaporator 10 with the refrigerant fluid flowing through serpentine tube 11 takes place. Thus, the air flowing through evaporator 10 is cooled by vaporization of the refrigerant fluid, and there is absorption of heat from the air to the refrigerant fluid. The cooled air leaving evaporator 10 is conducted into the passenger compartment of the automobile to air-condition the passenger compartment.

Because the second straight region 152b of conducting pipe portion 152 of inlet mechanism 15 is connected to the downstream opening end of header pipe portion 151, located at the air outflow side of evaporator 10, the refrigerant fluid conducted into conducting pipe portion 152 flows through the inner hollow space of header pipe portion 151 from the air outflow side to the air inflow side of evaporator 10. Refrigerant fluid flowing through the inner hollow space of header pipe portion 151 is distributed into each of the plurality of essentially parallel passages 112 defined in serpentine tube 11. The refrigerant fluid flows into each of the plurality of essentially parallel passages 112 in a non-uniform distribution pattern such that the amount of the refrigerant fluid flowing into each of the plurality of essentially parallel passages 112 gradually decreases from the air inflow side to the air outflow side of evaporator 10.

Since the refrigerant fluid flows into each of the plurality of essentially parallel passages 112 in a non-uniform distribution pattern, the air immediately flowing into evaporator 10, having a relatively high temperature, exchanges with the refrigerant fluid having a relatively large flow amount in passages 112 located at or near the air inflow side of evaporator 10. Accordingly, the heat exchange between the air flowing through evaporator 10 with the refrigerant fluid flowing through serpentine tube 11 is effectively carried out.

While the prior art evaporator has the advantage of its heat exchanging performance as described above, the prior art evaporator has a disadvantage in its construction as described in detail below.

As illustrated in FIG. 1, second straight region 152b of conducting pipe portion 152 of inlet mechanism 15 extends straight out from the downstream opening end of header pipe portion 151 located at the air outflow side of evaporator 10 so that the overall depth of evaporator 10 is unavoidably increased in an amount approximately equal to the length of second straight region 152b of conducting pipe portion 152. Moreover, the length of second straight region 152b must be long enough to allow conducting pipe portion 152 to be satisfactorily bent to form second straight region 152b. Therefore, the overall depth of the prior art evaporator can not be sufficiently reduced to allow the evaporator to be installed in an automobile where the interior space available to accommodate the evaporator is necessarily restricted.

SUMMARY OF THE INVENTION

Accordingly, it is an object of the present invention to provide a heat exchanger in which the overall depth is significantly reduced without substantially reducing its heat exchanging performance.

It is another object of the present invention to provide an easily manufactured heat exchanger in which overall depth is significantly reduced without substantially reducing its heat exchanging performance.

In order to achieve these objectives, the present invention provides a heat exchanger, such as an evaporator or a condenser, for use in an automotive air conditioning refrigeration circuit.

The heat exchanger in a preferred embodiment of the present invention includes a continuous serpentine flat tube having a length, a depth and an interior space through which refrigerant flows when the heat exchanger is in operation. The serpentine tube comprises a plurality of spaced, substantially parallel planar portions and a plurality of curved connecting portions interconnecting the parallel planar portions in a serpentine fashion, such that the plurality of curved connecting portions comprises a plurality of upper curved connecting portions and a plurality of lower curved connecting portions. The plurality of planar portions are vertically oriented when the heat exchanger is in an installed position. The serpentine tube has a first terminal end and a second terminal end and has a plurality of substantially parallel partition walls extending along the length of the serpentine tube, dividing the interior space of the serpentine tube into a plurality of parallel passages along the depth thereof, so that in operation, refrigeration fluid flows through the plurality of parallel passages in the serpentine tube from the first terminal end towards the second terminal end, and air passes through the heat exchanger between the plurality of planar portions.

Inlet and outlet mechanisms are provided at the first and the second terminal ends of the serpentine tube, respectively. The inlet mechanism includes a header pipe portion and a separate conducting pipe portion. In the preferred embodiment, the header pipe portion is cylindrical and the separate conducting pipe portion is cylindrical. The header pipe portion is disposed substantially parallel to the flow direction of air which passes through the heat exchanger when in an installed position, and is fixedly disposed at the first terminal end of the serpentine tube along the depth of the serpentine tube. The header pipe portion includes a first region adjacent to the air immediately upstream from the heat exchanger and a second region adjacent to the air immediately downstream from the heat exchanger. The second region of the header pipe portion has an inner side section which substantially faces the plurality of upper curved connecting portions. The header pipe portion also has an inner hollow space.

The conducting pipe portion has a first end and a second end, the second end being connected to the header pipe portion at the inner side section of the second region of the header pipe portion. Preferably, the conducing pipe portion includes a second straight region which is located adjacent to the second end of the conducting pipe portion and a first straight region which is located towards the first end of the conducting pipe portion, the first straight region lying between the second straight region and the first end of the conducting pipe portion. Preferably, the second straight region is substantially perpendicular to the first straight region. In a preferred embodiment, the second straight region of the conducting pipe portion is substantially perpendicular to the header pipe portion and the first straight region of the pipe portion is substantially parallel to the header pipe portion.

The outlet mechanism is connected to the second terminal end of the serpentine tube.

The first straight region of the conducting pipe portion is located between the header pipe portion and the first upper curved connecting portion of the serpentine tube. The first upper curved connecting portion is the upper curved connecting portion disposed adjacent (i.e., closest) to the header pipe portion of the serpentine tube. Alternatively, one end of the second straight region of the pipe portion extends toward the second upper curved connecting portion over and beyond the first upper curved connecting portion of the serpentine tube, so that the first straight region of the conducting pipe portion is located between the first upper curved connecting portion of the serpentine tube and the second upper curved connecting portion of the serpentine tube. The second upper curved connecting portion is the upper curved connecting portion disposed adjacent (i.e., closest) to the first upper curved connecting portion of the serpentine tube.

In another preferred embodiment, the conducting pipe portion has a flat pipe region, formed at the second end of the conducting pipe portion. The flat pipe region has a terminal end and an outer peripheral surface and a pair of opposite flat surfaces. An elongated oval hole is formed at the inner side section of the second region of the header pipe portion to receive the flat pipe region of the conducting pipe portion thereinto.

In another preferred embodiment, the flat pipe region of the conducting pipe portion includes a limiting mechanism, such as an oval step formed around the outer peripheral surface of the flat pipe region of the conducting pipe portion, for limiting axial movement of the conducting pipe portion when the flat pipe region of the conducting pipe portion is inserted into the inner hollow space of the header pipe portion through the elongated oval hole.

In still another preferred embodiment, the flat pipe region of the conducting pipe portion includes a preventing mechanism, such as a pair of wedge-shaped projections which are formed on the two opposite flat surfaces of the flat pipe region of the conducting pipe portion, and a widened section formed at the terminal end of the flat pipe region of the conducting pipe portion, for preventing axial movement of the conducting pipe portion after insertion of the flat pipe region of the conducting pipe portion into the inner hollow space of the header pipe portion through the elongated oval hole.

BRIEF DESCRIPTION OF THE DRAWINGS

The above-noted and other aspects of the present invention will become more apparent from a description of the preferred embodiments when read in conjunction with the accompanying drawings. The drawings illustrate the preferred embodiments of the invention. In the drawings, the same members have the same reference numerals.

FIG. 11c illustrates an enlarged front view of part of the conducting pipe portion of the inlet mechanism shown in FIG. 9 and taken on line $XI_c$—$XI_c$ in FIG. 11a.

FIG. 14c illustrates an enlarged front view of part of the conducting pipe portion of the inlet mechanism shown in FIG. 13 and taken on line $XIV_c$—$XIV_c$ of FIG. 14a.

FIG. 17c illustrates an enlarged front view of part of the conducting pipe portion of the inlet mechanism shown in FIG. 16 and taken on line $XVII_c$—$XVII_c$ in FIG. 17a.

DETAILED DESCRIPTION OF THE PREFERRED EMBODIMENTS

Figure 1:
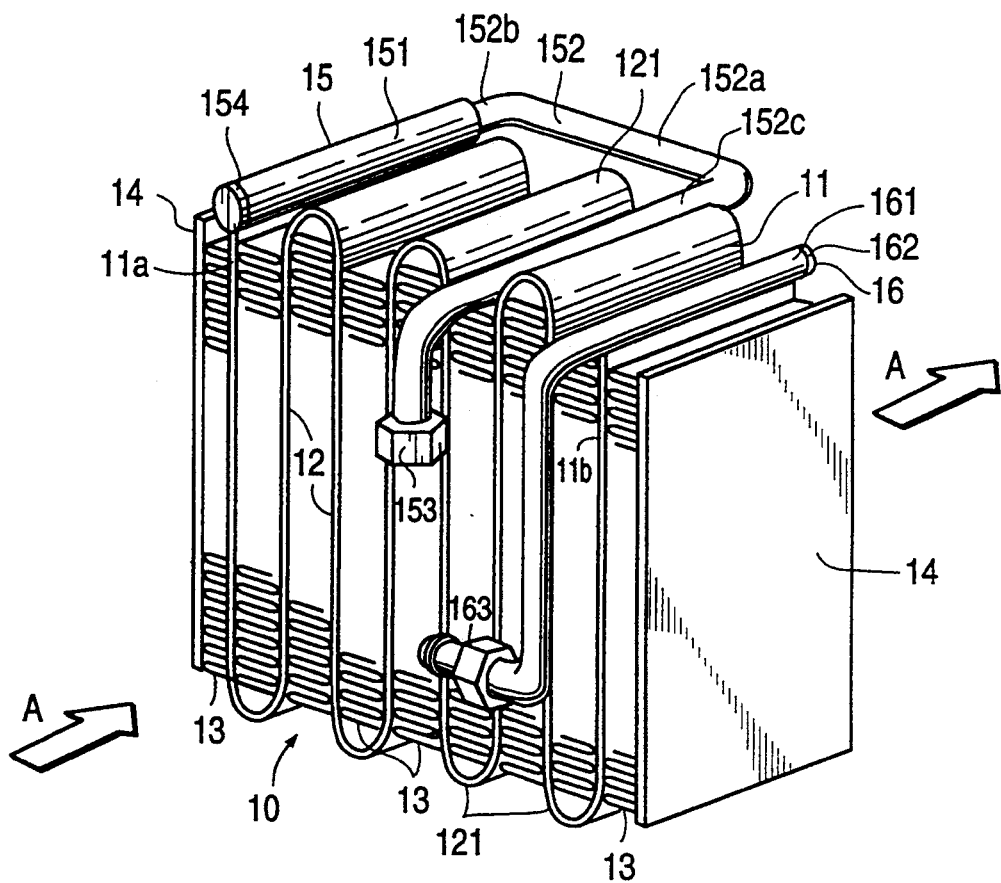
FIG. 1 illustrates a perspective view of a conventional serpentine-type evaporator for use in an automotive air conditioning refrigeration circuit.
Figure 2:
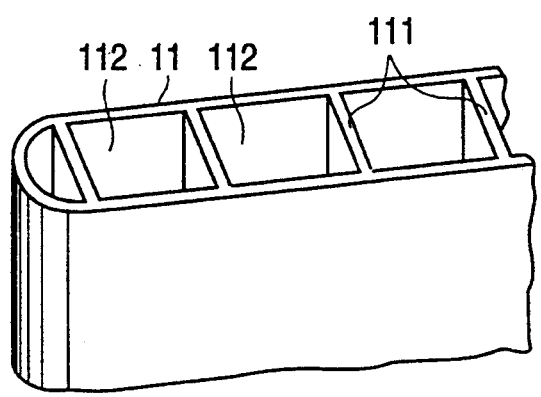
FIG. 2 illustrates a perspective view of part of the serpentine tube shown in FIG. 1.
Figure 3:
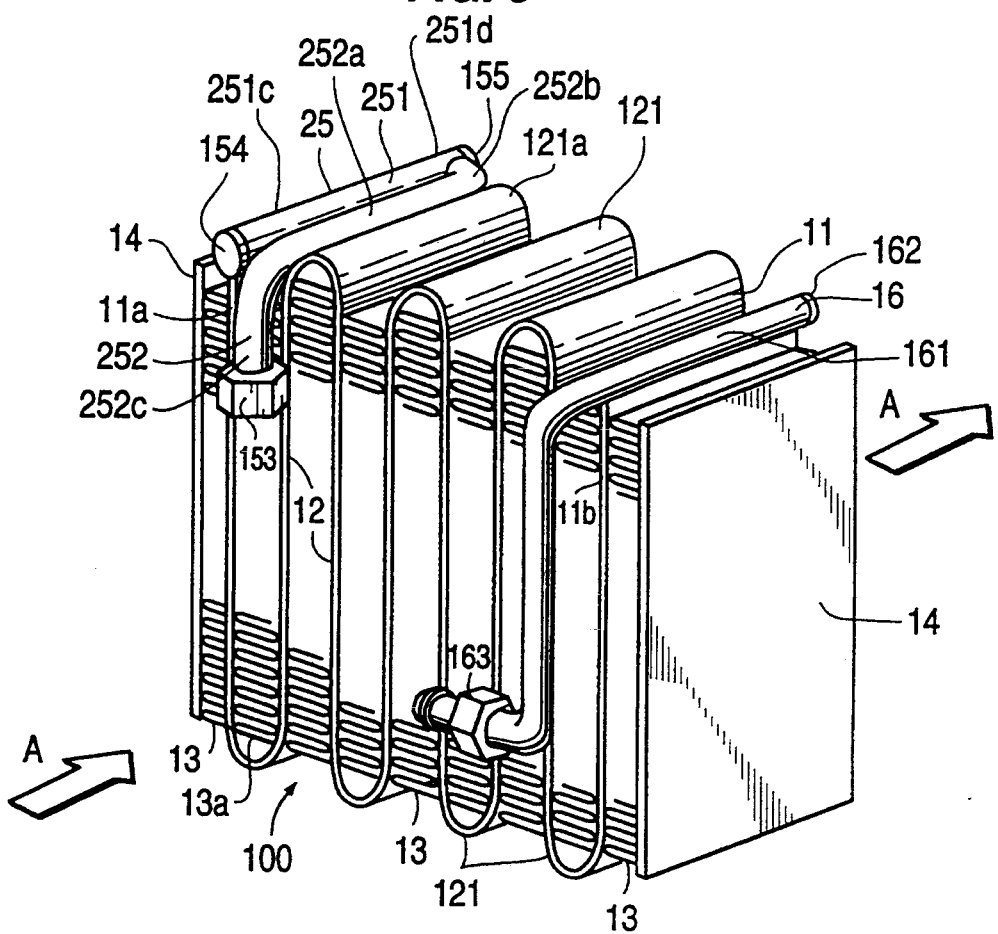
FIG. 3 illustrates a perspective view of a serpentine-type evaporator for use in an automotive air conditioning refrigeration circuit in accordance with a first embodiment of the present invention.

Referring to FIG. 3, an overall construction of a heat exchanger for use in an automotive air conditioning refrigeration circuit, such as serpentine-type evaporator 100, in accordance with a first embodiment of the present invention is shown. The same construction is accorded like numerals in FIG. 3 as were accorded in FIG. 1 and a description of same or identical elements is substantially omitted.

Referring to FIG. 3, serpentine-type evaporator 100 includes inlet mechanism 25 provided at first terminal end 11a of serpentine tube 11. Inlet mechanism 25 includes a cylindrical header pipe portion 251 having a clad construction and a separate cylindrical conducting pipe portion 252. Header pipe portion 251 is designed such that the length thereof is slightly greater than the depth of serpentine tube 11. The depth of serpentine tube 11 is the lateral dimension of serpentine tube 11 taken in the direction of airflow "A". Header pipe portion 251 has an air inflow region 251c (first region) and an air outflow region 251d (second region). Conducting pipe portion 252 includes integral first, second and third straight regions 252a, 252b and 252c. One end of first straight region 252a is connected at a right angle to one end of second straight region 252b, and the other end of first straight region 252a is connected at a right angle to one end of third straight region 252c. Second straight region 252b extends horizontally outward from one end of first straight region 252a with the other end of second straight region 252b connected to the header pipe portion 251 in the air outflow region 251d. The third straight region 252c extends vertically downward from the other end of first straight region 252a. Union joint mechanism 153 is provided at the other end of third straight region 252c of conducting pipe portion 252 allowing it to be connected to a connecting pipe member (not shown). A pair of cap members 154 and 155 also having a clad construction are provided at the two opening ends of header pipe portion 251, located at the air inflow (upstream) and air outflow (downstream) sides of evaporator 100, respectively, and are fixedly and hermetically connected thereto by brazing.

Figure 4:
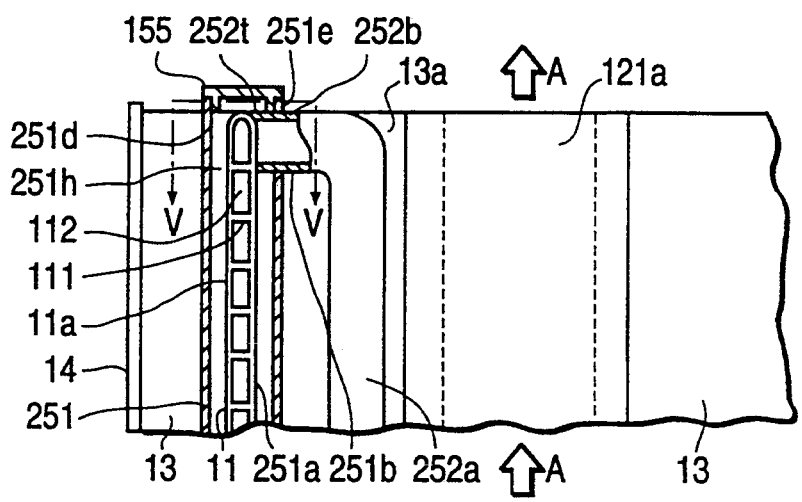
FIG. 4 illustrates an enlarged plan view of part of the serpentine-type evaporator shown in FIG. 3.
Figure 5:
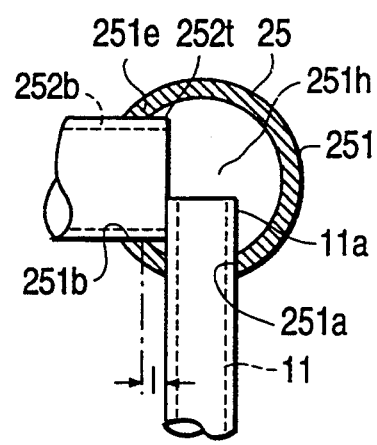
FIG. 5 illustrates an enlarged sectional view taken on line V—V of FIG. 4.
Figure 6:
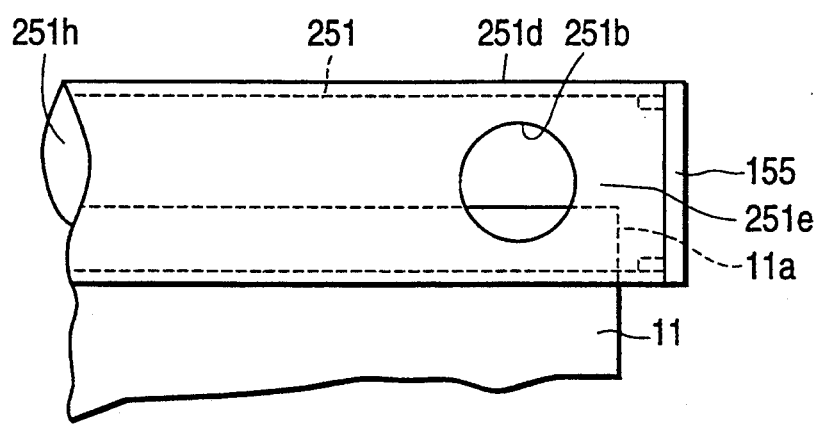
FIG. 6 illustrates an enlarged side view of a header pipe portion of an inlet mechanism of the serpentine-type evaporator shown in FIG. 3.

With reference to FIGS. 4–6, during the process of temporarily assembling the evaporator, the first terminal end 11a of serpentine tube 11 is inserted into an inner hollow space 251h of header pipe portion 251 through slot 251a, which is formed at the bottom region of header pipe portion 251, until the first terminal end 11a extends into the inner hollow space 251h a distance which is approximately one-third of the inner diameter of header pipe portion 251. Then, serpentine tube 11 and header pipe portion 251 are temporarily assembled to each other using a jig (not shown) for a subsequent brazing process in a furnace. Terminal end 252f of second straight region 252b is inserted into the inner hollow space 251h of header pipe portion 251 through circular hole 251b, which is formed at inner side section 251e of the air outflow region 251d of header pipe portion 251, until the terminal end 252t of second straight region 252b comes in contact with the exterior side surface of the first terminal end 11a of serpentine tube 11. Then, second straight region 252b and header pipe portion 251 are temporarily assembled to each other using a jig (not shown) for a subsequent brazing process in the furnace.

In this embodiment, as illustrated in FIG. 3, the first straight region 252a of conducting pipe portion 252 is located in the space which lies immediately above the uppermost surface of fin unit 13a and between header pipe portion 251 and first upper curved connecting portion 121a of serpentine tube 11. The first upper curved connecting portion 121a is the curved connecting portion adjacent (i.e., closest) to header pipe portion 251.

During operation of the automotive air conditioning refrigeration circuit which includes evaporator 100, air flows through evaporator 100 between substantially parallel planar portions 12 in the direction of arrows "A", as shown in FIG. 3. During operation, since the terminal end 252t of second straight region 252b of conducting pipe portion 252 of inlet mechanism 25 is connected to the inner side section 251e of the air outflow region 251d of header pipe portion 251, the refrigerant fluid conducted into conducting pipe portion 252 flows though the inner hollow space 251h of header pipe portion 251 from the air outflow side to the air inflow side of evaporator 100 in a substantially straight line. Simultaneously, the refrigerant fluid flowing through the inner hollow space 251h of header pipe portion 251 distributes into each of the plurality of essentially parallel passages 112 defined in serpentine tube 11. The refrigerant fluid flows into each of the plurality of essentially parallel passages 112 in a non-uniform manner such that the amount of the refrigerant fluid flowing into each of the plurality of essentially parallel passages 112 gradually decreases from the air inflow side to the air outflow side of evaporator 100.

Since the refrigerant fluid flows into each of the plurality of essentially parallel passages 112 in the above-described non-uniform distribution pattern, air immediately flowing into evaporator 100, having a relatively high temperature, exchanges with the refrigerant fluid having a relatively large flow amount in passages 112 located at or near the air inflow side of evaporator 100. Accordingly, as indicated by the graph of FIG. 19, the heat exchange between the air flowing through evaporator 100 with the refrigerant fluid flowing through serpentine tube 11 is carried out with equal or superior efficiency to the conventional serpentine-type evaporator.

Figure 19:
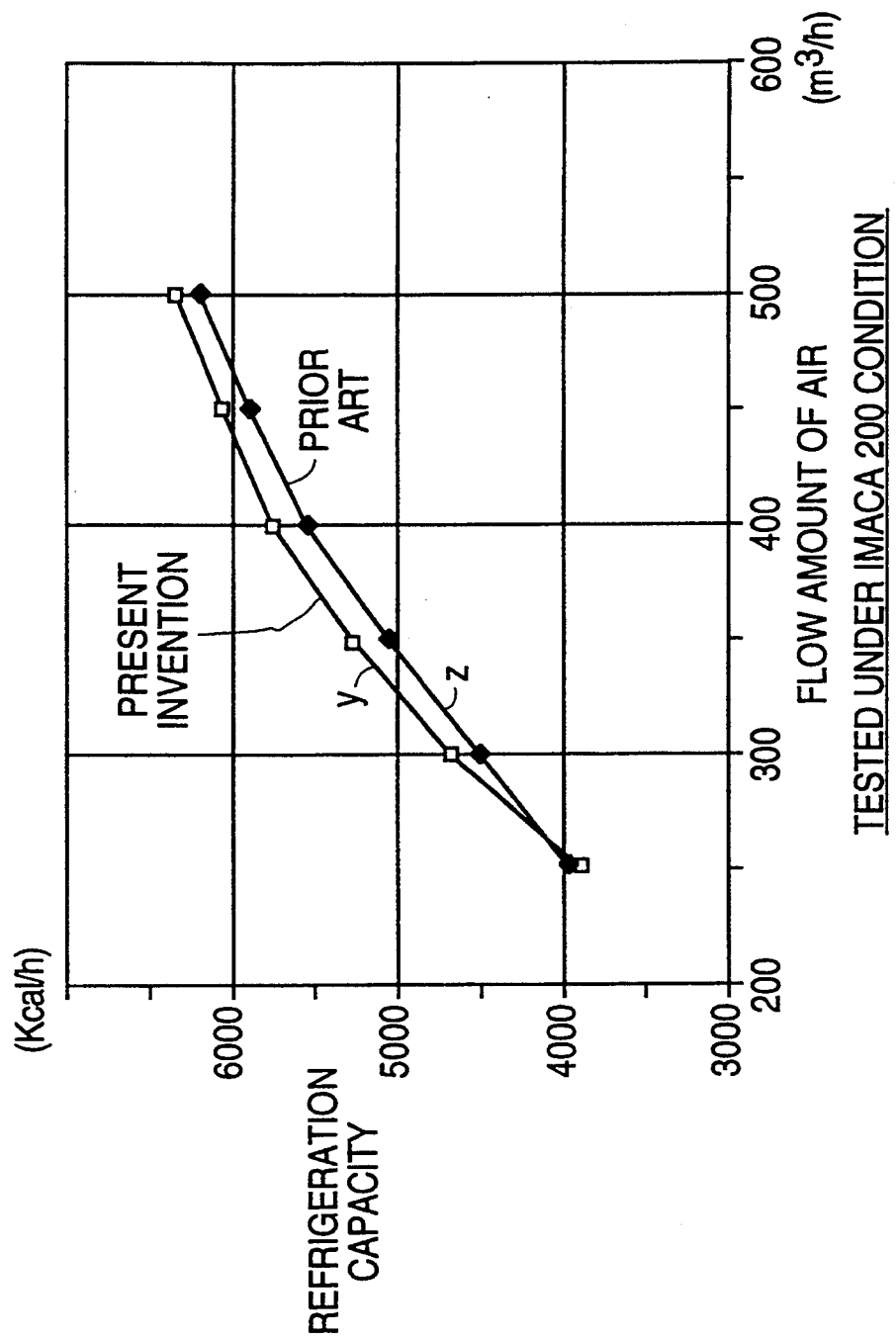
FIG. 19 illustrates a graph comparing the refrigeration capacity of the conventional serpentine type-evaporator with that of the serpentine- type evaporator in accordance with the first embodiment of the present invention.

In the graph of FIG. 19, the white dotted curve (i.e., curve y having data points represented by unfilled squares) represents the refrigeration capacity of the serpentine-type evaporator in accordance with the first embodiment of the present invention and the black dotted curve (i.e., curve z having data points represented by filled diamond shapes) represents that of the conventional serpentine-type evaporator previously described. The above refrigeration capacities have been tested under IMACA 200 conditions, wherein dry-bulb temperature of the air immediately upstream of the evaporator is 32.2° C., wet-bulb temperature of the air immediately upstream of the evaporator is 23.9° C., pressure at the outlet of the evaporator is 1.76 kg/cm$^2$·G, pressure immediately upstream from an expansion device of the refrigeration circuit is 14 kg/cm$^2$·G, and supercooling is 5° C. As described in the graph, in general, the present invention is slightly superior in performance to the prior art.

In addition to the above, evaporator 100 in this embodiment has another advantage resulting from its construction as described in detail below. As illustrated in FIGS. 3 and 4, second straight region 252b of conducting pipe portion 252 of inlet mechanism 25 is perpendicular to and extends straight into the inner side section 251e of the air outflow region 251d of header pipe portion 251 so that the overall depth of evaporator 100 can be significantly reduced in comparison with conventional serpentine evaporators. Consequently, installation of evaporator 100 in the interior space of an automobile is more flexible, and the evaporator can be installed in an automobile where the depth of the interior space is restricted.

FIGS. 7-8, 9-12, 13-15 and 16-18 illustrate inlet mechanisms of heat exchangers for use in an automotive air conditioning refrigeration circuit, such as serpentine-type evaporators, in accordance with the second, third, fourth and fifth embodiments of the present invention, respectively. The same construction is accorded like numerals as shown with respect to FIGS. 3-6 as were accorded in previous figures, and the description of the same or identical elements is substantially omitted.

Figure 7:
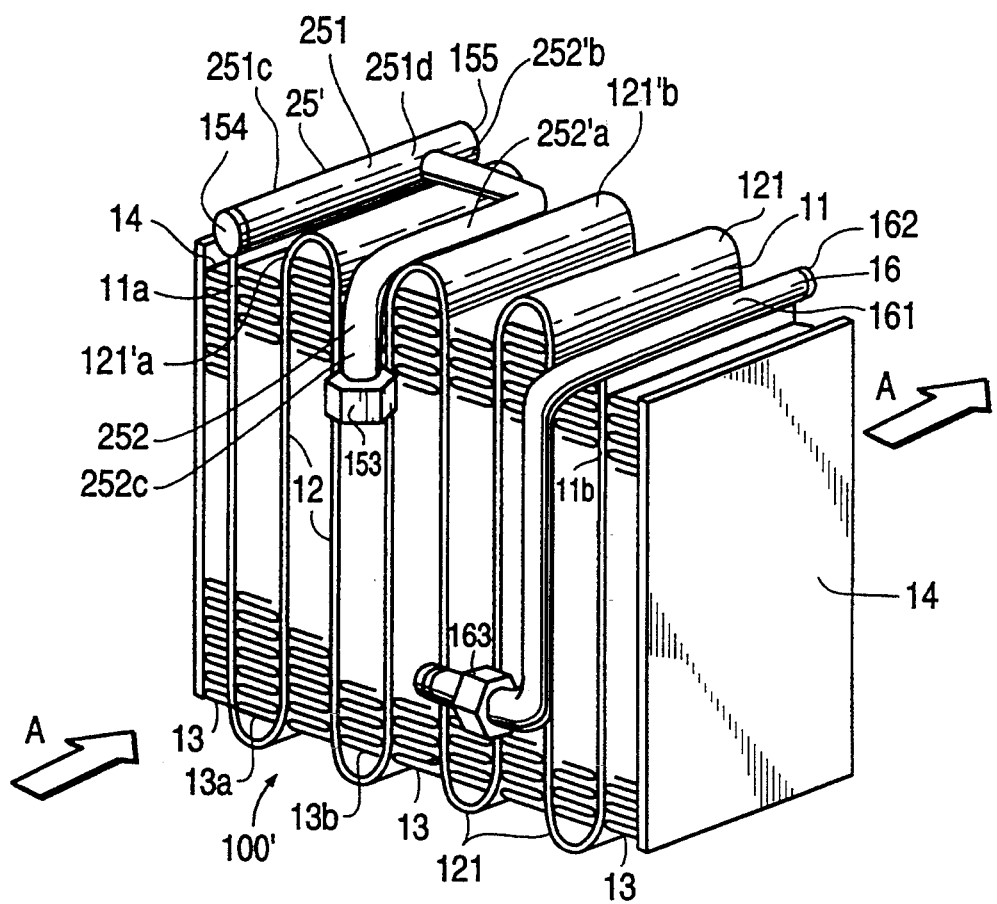
FIG. 7 illustrates a perspective view of a serpentine-type evaporator for use in an automotive air conditioning refrigeration circuit in accordance with a second embodiment of the present invention.
Figure 8:
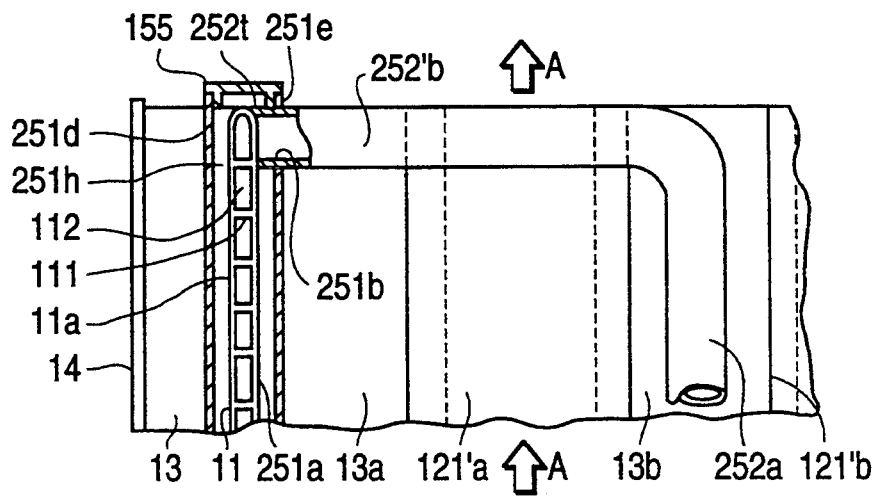
FIG. 8 illustrates an enlarged plan view of a part of the serpentine-type evaporator shown in FIG. 7.

With reference to FIGS. 7 and 8, the overall construction of a heat exchanger for use in an automotive air conditioning refrigeration circuit, such as serpentine-type evaporator 100', in accordance with the second embodiment of the present invention is shown. In this embodiment, evaporator 100' is designed such that the upper ridge of first upper curved connecting portion 121'a of serpentine tube 11, which is the curved connecting portion adjacent (i.e., closest) to header pipe portion 251 of inlet mechanism 25', is lower than that of the other curved connecting portions 121 of serpentine tube 11, so that the second straight region 252'b of conducting pipe portion 252 of inlet mechanism 25' can extend from the header pipe portion 251 inwardly (i.e., toward the header pipe portion 161) over and beyond curved portion 121'a of serpentine tube 11. One end of second straight region 252'b of conducting pipe portion 252 is connected at a right angle to one end of first straight region 252a of conducting pipe portion 252 so that first straight region 252a of conducting pipe portion 252 is located in the space which is immediately above the uppermost surface of fin unit 13b, and is between first upper curved connecting portion 121'a of serpentine tube 11 and the second upper curved connecting portion 121'b of serpentine tube 11, the second upper curved connecting portion being the curved connecting portion adjacent (i.e., closest) to first upper curved connecting portion 121'a of serpentine tube 11. Accordingly, the length of second straight region 252'b is long enough to permit conducting pipe portion 252 to be bent so as to satisfactorily form second straight region 252'b. The other effects or advantages of this embodiment are similar to those of the first embodiment so that an explanation thereof is omitted.

Figure 9:
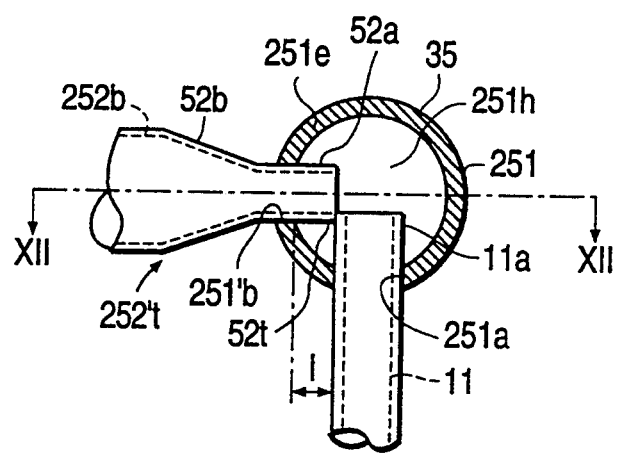
FIG. 9 illustrates a view similar to FIG. 5 in which an inlet mechanism of a serpentine-type evaporator in accordance with a third embodiment of the present invention is shown.
Figure 10:
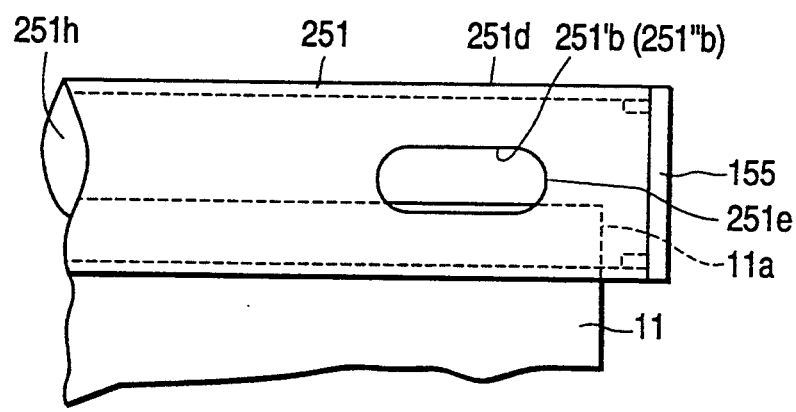
FIG. 10 illustrates a view similar to FIG. 6 in which a side view of the header pipe portion of the inlet mechanism shown in FIG. 8 is shown.
Figure 11A:
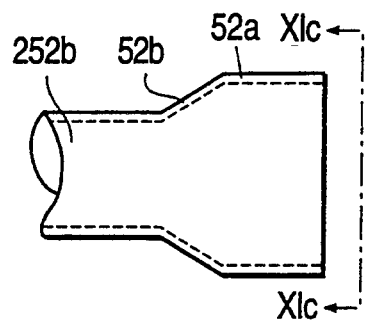
FIG. 11a illustrates an enlarged plan view of part of the conducting pipe portion of the inlet mechanism shown in FIG. 9.
Figure 11B:
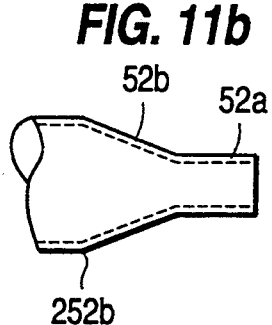
FIG. 11b illustrates an enlarged side view of part of the conducting pipe portion of the inlet mechanism shown in FIG. 9.
Figure 11C:
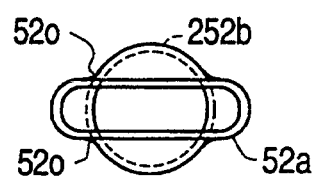

FIGS. 9-12 illustrate an inlet mechanism 35 of a heat exchanger for use in an automotive air conditioning refrigeration circuit, such as a serpentine-type evaporator in accordance with a third embodiment of the present invention. With reference to FIGS. 9-12, conducting pipe portion 252 of inlet mechanism 35 includes flat pipe region 52a formed at the terminal end portion 252't of cylindrical second straight region 252b thereof and generally funnel-shaped region 52b connecting flat pipe region 52a to cylindrical second straight region 252b. Flat pipe region 52a has a pair of opposite substantially flat upper and lower surfaces, 52o. Elongated oval slot 251'b is formed at inner side section 251e of the air outflow region 251d of header pipe portion 251 as illustrated in FIG. 10. Slot 251'b and the vertical cross section of flat pipe region 52a of conducting pipe portion 252 are of a similar shape, except that slot 251'b is designed so that the opening thereof is slightly greater than the area of the vertical cross section of flat pipe region 52a.

Figure 12:
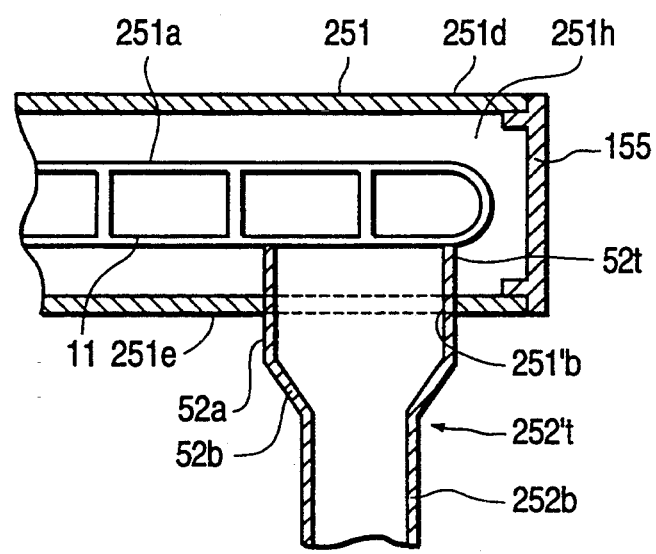
FIG. 12 illustrates a sectional view taken on line XII—XII of FIG. 9.

With reference to FIGS. 9 and 12, in the process of temporarily assembling the evaporator, flat pipe region 52a of conducting pipe portion 252 is inserted into the inner hollow space 251h of header pipe portion 251 through slot 251'b until the terminal end 52t of flat pipe region 52a comes in contact with the upper edge the first terminal end 11a of serpentine tube 11. Then, second straight region 252b of conducting pipe portion 252 and header pipe portion 251 are temporarily assembled to each other using a jig (not shown) for a subsequent brazing process in the furnace.

According to this embodiment, because of the engagement between elongated oval slot 251'b and flat pipe region 52a of conducting pipe portion 252, there is no need to take steps to prevent rotation of second straight region 252b of conducting pipe portion 252 during the temporary assembling process of the evaporator. Furthermore, since the opening 251'b is in an elongated oval configuration, the length of the line of contact between the inner periphery of opening 251'b with the outer periphery of second straight region 252b of conducting pipe portion 252, and the inserting length "1" of second straight region 252b of conducting pipe portion 252 into the inner hollow space 251h of header pipe portion 251 have a larger value than that obtained in the embodiment depicted in FIG. 5. As a result, second straight region 252b of conducting pipe portion 252 and header pipe portion 251 are more effectively and sufficiently brazed to each other in the brazing process of the evaporator. Moreover, since the inserting end of second straight region 252b of conducting pipe portion 252 is in contact with only the upper edge of first terminal end 11a of serpentine tube 11 during the process of temporarily assembling the evaporator, and the above engagement is maintained during the brazing process of the evaporator, the refrigerant fluid can flow smoothly into the inner hollow space 251h of header pipe portion 251 from second straight region 252b of conducting pipe portion 252 in the finished evaporator.

Figure 14A:
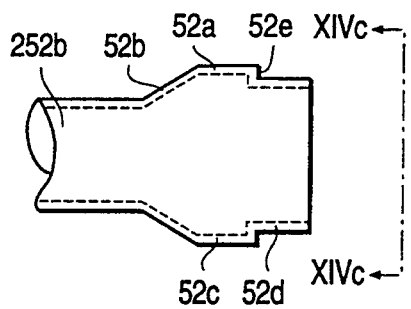
FIG. 14a illustrates an enlarged plan view of part of the conducting pipe portion of the inlet mechanism shown in FIG. 13.
Figure 14B:
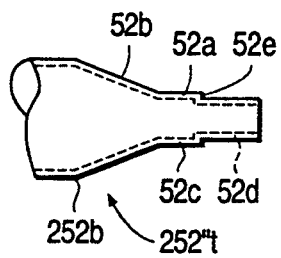
FIG. 14b illustrates an enlarged side view of part of the conducting pipe portion of the inlet mechanism shown in FIG. 13.
Figure 14C:
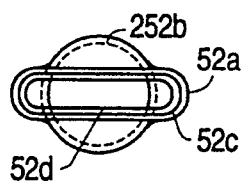
Figure 15:
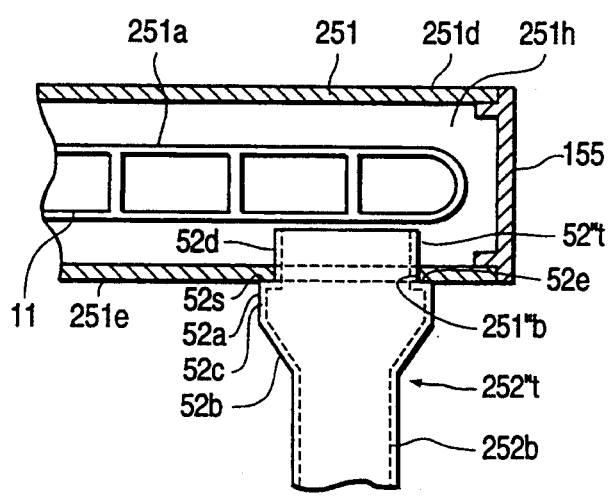
FIG. 15 illustrates an enlarged sectional view taken on line XV—XV of FIG. 13.
Figure 13:
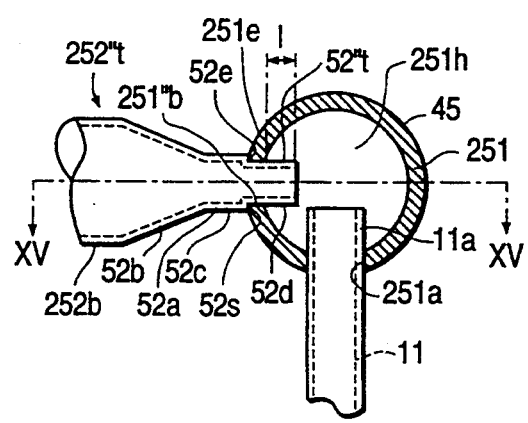
FIG. 13 illustrates a view similar to FIG. 5 in which an inlet mechanism of a serpentine-type evaporator in accordance with a fourth embodiment of the present invention is shown.

FIGS. 13-15 illustrate inlet mechanism 45 of a heat exchanger for use in an automotive air conditioning refrigeration circuit, such as a serpentine-type evaporator, in accordance with a fourth embodiment of the present invention. With reference to FIGS. 13-15, conducting pipe portion 252 of inlet mechanism 45 includes flat pipe region 52a formed at the terminal end portion 252't of cylindrical second straight region 252b thereof and generally funnel-shaped region 52b connecting flat pipe region 52a to cylindrical second straight region 252b. Flat pipe region 52a comprises first section 52c and second section 52d which extends outwardly (i.e., parallel to the main axis of cylindrical second straight region 252b) from one end of first section 52c. Second section 52d is designed so that its vertical cross sectional area is slightly smaller than the vertical cross-sectional area of first section 52c. Therefore, oval step 52e is created at the boundary between first section 52c and second section 52d. Elongated oval slot 251"b is formed at the inner side section 251e of the air outflow region 251d of header pipe portion 251 as illustrated in FIG. 10. Slot 251"b and the vertical cross section of flat pipe region 52a of conducting pipe portion 252 are similar in shape, except that slot 251"b is designed so that the area of its opening is slightly greater than the area of the vertical cross section of second section 52d of flat pipe region 52a but is smaller than the vertical cross-sectional area of the vertical cross section of first section 52c of flat pipe region 52a.

With reference to FIGS. 13 and 15, in the process of temporarily assembling the evaporator, second section 52d of flat pipe region 52a of conducting pipe portion 252 is inserted into the inner hollow space 251h of header pipe portion 251 through slot 251"b until the side wall 52s of oval step 52e comes into contact with the surface of the inner side section 251e about the peripheral edge of slot 251"b. In this engagement, a small air gap is created between the terminal end 52"t of second section 52d of flat pipe region 52a and the upper edge of the first terminal end 11a of serpentine tube 11. Second straight region 252b of conducting pipe portion 252 and header pipe portion 251 are then temporarily assembled to each other using a jig (not shown) for a subsequent brazing process in the furnace.

According to this embodiment, in the process of temporarily assembling the evaporator, the insertion of second straight region 252b of conducting pipe portion 252 into the inner hollow space 251h of header pipe portion 251 is stopped when the side wall 52s of oval step 52e comes in contact with the surface of the inner side section 251e about the peripheral edge of slot 251"b. As a result, the inserting length "l" of second straight region 252b of conducting pipe portion 252 into the inner hollow space 251h of header pipe portion 251 is more effectively controlled during the temporary assembling process of the evaporator, as compared to the first and third embodiments. Of course, this embodiment also has the other advantages described in the third embodiment.

Figure 17A:
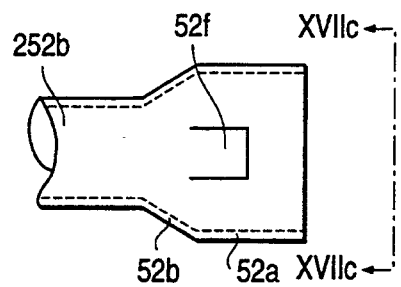
FIG. 17a illustrates an enlarged plan view of part of the conducting pipe portion of the inlet mechanism shown in FIG. 16.
Figure 17B:
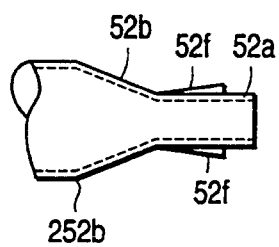
FIG. 17b illustrates an enlarged side view of part of the conducting pipe portion of the inlet mechanism shown in FIG. 16.
Figure 17C:
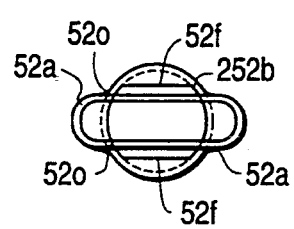
Figure 18:
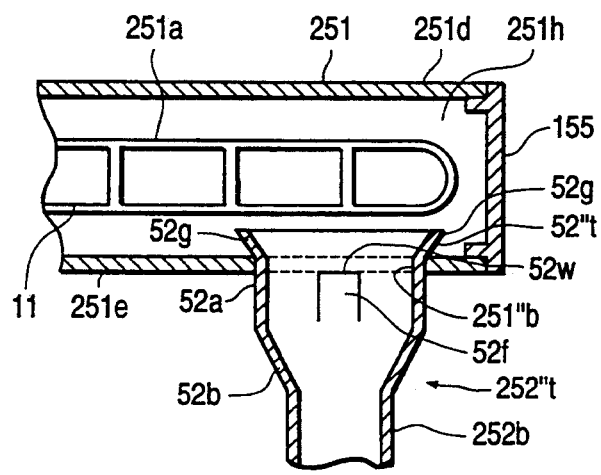
FIG. 18 illustrates an enlarged sectional view taken on line XVIII—XVIII of FIG. 16.
Figure 16:
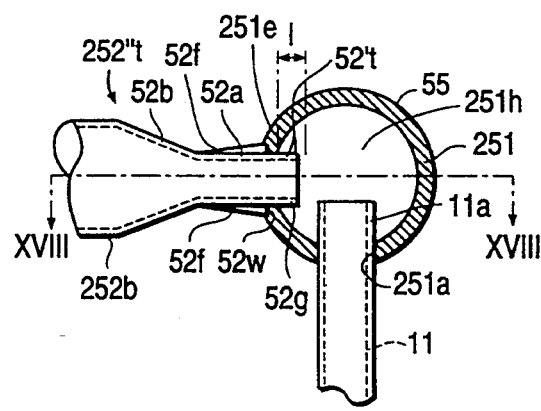
FIG. 16 illustrates a view similar to FIG. 5 in which an inlet mechanism of a serpentine-type evaporator in accordance with a fifth embodiment of the present invention is shown.

FIGS. 16–18 illustrate inlet mechanism 55 of a heat exchanger for use in an automotive air conditioning refrigeration circuit, such as a serpentine-type evaporator, in accordance with a fifth embodiment of the present invention. With reference to FIGS. 16–18, conducting pipe portion 252 of inlet mechanism 55 includes flat pipe region 52a formed at the terminal end portion 252"t of cylindrical second straight region 252b thereof and generally funnel-shaped region 52b connecting flat pipe region 52a to cylindrical second straight region 252b. A pair of wedge-shaped projections 52f are formed in the center of the upper and lower surfaces 52o of flat pipe region 52a, respectively. Elongated oval slot 251'b is formed at the inner side section 251e of the air outflow region 251d of header pipe portion 251 as illustrated in FIGS. 16–18. Slot 251'b and the vertical cross section of flat pipe region 52a of conducting pipe portion 252 are of similar shape, except that slot 251'b is designed so that the opening area thereof is slightly greater than the area of the vertical cross section of flat pipe region 52a.

With reference to FIGS. 16 and 18, in the process of temporarily assembling the evaporator, flat pipe region 52a of conducting pipe portion 252 is inserted into the inner hollow space 251h of header pipe portion 251 through slot 251'b until the sharper sloping surface 52w of wedge-shaped projections 52f come in contact with the surface of the inner side section 251e about the peripheral edge of slot 251'b. Then, the terminal end 52't of flat pipe region 52a is widened in a horizontal direction (i.e., parallel to the main axis of header pipe portion 251) using a widening apparatus (not shown) forming the widened terminal end section 52g, so as to prevent the axial backward movement of second straight region 252b of conducting pipe portion 252. Axial movement of second straight region 252b of conducting pipe portion 252 is prevented by the pair of wedge-shaped projections 52f and the widened terminal end section 52g.

Thus, during the temporary assembling process of the evaporator, second straight region 252b of conducting pipe portion 252 and header pipe portion 251 may be temporarily assembled to each other without using a jig for the subsequent brazing process in the furnace. Of course, this embodiment also has the other advantages described in the third and fourth embodiments.

The inlet constructions described in the third through fifth embodiments are equally applicable and may be used in making the evaporators described in both the first and second embodiments.

The invention has been described in detail in connection with the preferred embodiments. These embodiments, however, are merely for example only and the invention is not restricted thereto. It will be understood by those skilled in the art that other variations and modifications can be easily be made within the scope of the invention as defined by the appended claims.

What is claimed is:

1. A heat exchanger for use in a refrigeration circuit, the heat exchanger comprising:

a continuous serpentine flat tube having a length, a depth, and an interior space through which a refrigerant flows when the heat exchanger is in operation, the serpentine tube comprising a plurality of spaced, substantially parallel planar portions and a plurality of curved portions interconnecting the parallel planar portions in a serpentine fashion, such that the plurality of curved portions comprises a plurality of upper curved portions and a plurality of lower curved portions, the serpentine tube having a first terminal end and a second terminal end, and a plurality of substantially parallel partition walls extending along the length of the serpentine tube dividing the interior space of the serpentine tube into a plurality of parallel passages along the depth thereof, so that in operation the refrigerant fluid through the plurality of parallel passages of the serpentine tube from the first terminal end towards the second terminal end and air passes through the heat exchanger between the plurality of planar portions;

inlet means connected to the first terminal end of the serpentine tube, the inlet means comprising a header pipe portion and conducting pipe portion, the header pipe portion being disposed substantially paralled to a flow direction of the air which passes through the heat exchanger when in an installed position, the header pipe being fixedly disposed at the first terminal end of the serpentine tube along the depth of the serpentine tube, the header pipe portion including a first region adjacent to the air immediately upstream from the heat exchanger and a second region adjacent to the air immediately downstream from the heat exchanger, the second region having an inner side section substantially facing the plurality of upper curved portions, the conducting pipe portion having a first end and a second end, the second end being connected to the header pipe portion at the inner side section of the second region of the header pipe portion, the conducting pipe portion including a first straight region which is located towards the first end of the conducting pipe portion, and a second straight region which is located adjacent to the second end of the conducting pipe portion, the second straight region being substantially perpendicular to the first straight region; and outlet means connected to the second terminal end of the serpentine tube.

2. The heat exchanger recited in claim 1, wherein the second straight region of the conducting pipe portion is substantially perpendicular to the header pipe portion, and the first straight region of the conducting pipe portion is substantially parallel to the header pipe portion.

3. The heat exchanger recited in claim 2, wherein the first straight region of the conducting pipe portion is located between the header pipe portion and a first upper curved portion of the plurality of upper curved portions of the serpentined tube, the first upper curved portion being disposed adjacent to the header pipe portion.

4. The heat exchanger recited in claim 2, wherein the plurality of upper curved portions further comprises a second upper curved portion disposed adjacent to the first upper curved portion, and wherein the second straight region of the conducting pipe portion extends toward the second upper curved portion over and beyond the first upper curved portion, and the first straight region of the conducting pipe portion is located between the first upper curved portion and the second upper curved portion.

5. The heat exchanger recited in claim 1, wherein the conducting pipe portion is cylindrical.

6. The heat exchanger recited in claim 5, wherein the header pipe portion is cylindrical.

7. The heat exchanger recited in claim 6, wherein the conducting pipe portion further comprises a flat pipe region formed at the second end thereof, the flat pipe region having a terminal end, an outer peripheral surface, and a pair of opposite flat surfaces.

8. The heat exchanger recited in claim 7, wherein an elongated oval hole is formed at the inner side section of the second region of the header pipe portion to receive the flat pipe region of the conducting pipe portion thereinto.

9. The heat exchanger recited in claim 8, wherein the header pipe portion has an inner hollow space and wherein the flat pipe region of the conducting pipe portion includes limiting means for limiting axial movement of the conducting pipe portion when the flat pipe region of the conducting pipe portion is inserted into the inner hollow space of the header pipe portion through the elongated oval hole.

10. The heat exchanger recited in claim 9, wherein the limiting means comprises an oval step formed around the outer peripheral surface of the flat pipe region of the conducting pipe portion.

11. The heat exchanger recited in claim 8, wherein the header pipe portion has an inner hollow space and wherein the flat pipe region of the conducting pipe portion further comprises preventing means for preventing axial movement of the conducting pipe portion after insertion of the flat pipe region of the conducting pipe portion into the inner hollow space of the header pipe portion through the elongated oval hole.

12. The heat exchanger recited in claim 11, wherein the preventing means comprises a pair of wedge-shaped projections which are formed on the pair of opposite flat surfaces of the flat pipe region of the conducting pipe portion, and wherein the preventing means further comprises a widened section formed at the terminal end of the flat pipe region of the conducting pipe portion.

* * * * *